Patented June 16, 1936

2,044,671

UNITED STATES PATENT OFFICE 2,044,671

SOLDER FOR ALUMINUM

Ralph B. Derr and Conral C. Callis, Oakmont, Pa., assignors to Aluminum Company of America, Pittsburgh, Pa., a corporation of Pennsylvania No Drawing. Application October 24, 1934, Serial No. 749,817

4 Claims. (Cl. 75—134)

This invention relates to a composition of matter for soldering aluminum and aluminum base alloys and particularly to a soldering composition having certain desirable characteristics for particular applications hereinafter described.

In the manufacture of many composite structures such as, for example, radiator cores, the various parts are placed in their proper respective positions and while held in these positions are dipped in a molten solder bath. For economy of solder, the entire structure is not immersed in the solder bath but only a portion of the structure is placed in the bath and solder is carried to the unimmersed portion by capillary action. To obtain a capillary flow it is necessary that the structure be heated above the melting point of the solder, and to a temperature sufficient to cause rapid interdiffusion of the solder and the aluminum surface being soldered. Preheating of the structure is impractical in many cases and to obtain the maximum travel by capillary action it is necessary that the structure be heated entirely by the rapid conduction of heat from the solder bath.

It is apparent that a solder suitable for such applications must be one which can be applied at temperatures considerably above its melting point in order that the structure being soldered may be suitably heated by a partial immersion in the bath.

When a composite structure such as that described above is made entirely of aluminum or includes aluminum parts the conditions are considerably complicated due to the soldering characteristics of this material. It is well known that many soldering compositions suitable for joining other materials are unsuitable for the soldering of aluminum because they do not adhere to aluminum surfaces, that is, an interdiffusion of the solder and the aluminum surface being soldered is not obtained. The interdiffusion of any given solder with aluminum is greatly increased with increase of the temperature of application and many solders which exhibit this characteristic at moderate temperatures when applied at higher temperatures will completely dissolve thin aluminum portions if included in the structure.

We have found a solder consisting of about 30 to 63 per cent by weight of tin, 25 to 55 per cent by weight of lead, 8 to 25 per cent by weight of zinc and 1 to 15 per cent by weight of cadmium to be one which can be applied at the high temperatures used in dipping operations of the type described. While all of the solders within the foregoing limits are utilizable, we prefer a solder containing about 44 to 54 per cent by weight of tin, 25 to 32 per cent by weight of lead, 10 to 20 per cent by weight of zinc and 5 to 10 per cent by weight of cadmium. Two solders which have exhibited desirable characteristics to a marked degree are:

|     | Tin  | Lead | Zinc | Cadmium |
|-----|------|------|------|---------|
| I   | 38.5 | 31.5 | 20.0 | 10.0    |
| II  | 53.5 | 31.5 | 10.0 | 5.0     |

The incipient solidification point of the solder designated as "I" is substantially 600° F. and of the solder designated as "II" is substantially 500° F. Structures including aluminum as thin as 0.006 inch have been immersed in these solders and held at temperatures of 900° F. for periods of about 15 seconds without injurious effects to the aluminum. Joints formed of these solders are strong, corrosion resistant to a marked degree, and retain their color well in ordinary atmospheric conditions.

While we have described these solders as being applied by dipping processes, they are also advantageously used in soldering by the other well known processes such as by using a soldering iron. In many applications the solders may be applied without a flux but their application can be facilitated by the use of almost any of the commercial fluxes used with aluminum. In the dipping processes described, a flux consisting of an alcohol in which is suspended from 10 to 50 per cent by weight of zinc chloride has been used with good results.

We claim:

1. A solder for aluminum and its alloys consisting of about 30 to 63 per cent by weight of tin, 25 to 55 per cent by weight of lead, 8 to 25 per cent by weight of zinc and 1 to 15 per cent by weight of cadmium.

2. A solder for aluminum and its alloys consisting of about 44 to 54 per cent by weight of tin, 25 to 32 per cent by weight of lead, 10 to 20 per cent by weight of zinc and 5 to 10 per cent by weight of cadmium.

3. A solder for aluminum and its alloys consisting of about 38.5 per cent by weight of tin, 31.50 per cent by weight of lead, 20.0 per cent by weight of zinc and 10.0 per cent by weight of cadmium.

4. A solder for aluminum and its alloys consisting of about 53.5 per cent by weight of tin, 31.5 per cent by weight of lead, 10.0 per cent by weight of zinc and 5.0 per cent by weight of cadmium.

RALPH B. DERR.
CONRAL C. CALLIS.